United States Patent [19]

Young, II

[11] 4,434,787

[45] Mar. 6, 1984

[54] SOLAR POWERED REACTOR

[76] Inventor: Ronald R. Young, II, Box 336XA, Woodville Cir., Sumter, S.C. 29150

[21] Appl. No.: 301,007

[22] Filed: Sep. 10, 1981

Related U.S. Application Data

[63] Continuation-in-part of Ser. No. 87,380, Oct. 23, 1979, abandoned, which is a continuation of Ser. No. 870,349, Jan. 18, 1978, abandoned.

[51] Int. Cl.³ .............................. F24J 3/02; G02B 5/12
[52] U.S. Cl. .................................... 126/438; 126/440; 350/289; 350/445
[58] Field of Search ............... 126/438, 439, 440, 449; 350/289, 445, 288

[56] References Cited

U.S. PATENT DOCUMENTS

| 514,669 | 2/1894 | Allingham | 126/438 |
| 1,302,363 | 4/1919 | Graham | 126/440 |
| 3,985,118 | 10/1976 | Bard | 126/440 |
| 4,266,530 | 5/1981 | Steadman | 126/438 |

FOREIGN PATENT DOCUMENTS 251334 10/1947 Switzerland .................... 126/440

Primary Examiner—Samuel Scott
Assistant Examiner—G. Anderson
Attorney, Agent, or Firm—Luke J. Wilburn, Jr.; Wellington M. Manning, Jr.

[57] ABSTRACT

A solar powered reactor for collecting and converting solar energy into heat energy in the form of a heated fluid, such as steam, comprising a reactor vessel for containing a heat transfer fluid, such as water, and having an inlet and outlet for introduction of the fluid and discharge of the heated fluid in the form of steam therefrom. The vessel contains a light transmitting window in its upper portion, above which is located in spaced, heat-insulated relation therefrom, a single large concentrating lens of the Fresnel type construction to receive and direct both direct and reflected sunlight into the reactor vessel. A solar reflector is mounted on a trackway to move about the periphery of the concentrating lens to follow the path of the sun and reflect sunlight into the lens for direction through the light transmitting window and onto one or more heat conductive metal elements located in the reactor vessel.

5 Claims, 2 Drawing Figures

SOLAR POWERED REACTOR

This application is a continuation-in-part of copending patent application Ser. No. 06/087,380, filed Oct. 23, 1979, now abandoned which is in turn a continuation of U.S. patent application Ser. No. 870,349 filed Jan. 18, 1978, now abandoned.

This invention relates to a solar powered reactor for converting solar energy into a source of utilizeable heat energy for various end uses. More particularly, the invention comprises a solar powered reactor of relatively simplified and inexpensive construction which may be utilized economically and efficiently to produce a high temperature energy source, in particular, in the form of a heated fluid medium.

BACKGROUND OF THE INVENTION

Due to limited availability and expense of conventional fossil fuel energy sources, major efforts have been recently directed to the manufacture and use of apparatus for conversion of solar energy into a useable energy medium for both industrial and home use. Solar powered energy generators of both active and passive types are known. Generally, passive type solar powered energy generators comprise large solar collectors containing a heat transfer medium, such as water, and suitably located for receiving direct sunlight, such as on the roof of a building. Such passive collector systems have certain disadvantages, in that the collectors must be extremely large and properly oriented to capture sufficient direct sunlight for conversion to utilizeable heat energy, their efficiency is directly affected by seasonal variations of the position of the sun and the geographic location of use, and many of such systems lose a great deal of collected heat energy during non-sunlight hours and when environmental temperatures are low.

Active solar energy collection systems generally comprise either movable solar collectors containing a heat transfer medium, or movable sunlight reflectors, such as parabolic mirrors, which operate to track the sun in its path across the sky and reflect and concentrate the sunlight at a desired location on a heat transfer medium in the solar collector. Although such active systems overcome certain disadvantages of the passive type solar collector systems, they are generally quite expensive to construct and operate, and, as a result, are not practical for many applications, such as for home use.

Various solar energy collector systems are exemplified in the following United States Patents which have been referred to or cited in prosecution of my aforesaid U.S. patent applications identified above:

U.S. Pat. No. 679,451
U.S. Pat. No. 1,785,651
U.S. Pat. No. 1,993,213
U.S. Pat. No. 3,203,167
U.S. Pat. No. 3,451,342
U.S. Pat. No. 3,985,118
U.S. Pat. No. 3,989,417
U.S. Pat. No. 4,002,031
U.S. Pat. No. 4,018,212
U.S. Pat. No. 4,024,715
U.S. Pat. No. 4,026,267
U.S. Pat. No. 4,043,315
U.S. Pat. No. 4,068,474
U.S. Pat. No. 4,129,120
U.S. Pat. No. 4,188,941

A major problem of solar powered collectors or concentrations presently in the marketplace is the lack of optical precision and structural firmness of the active collector systems, and the massive structural design and poor efficiency of passive type systems.

BRIEF DESCRIPTION OF THE PRESENT INVENTION

In contrast to those solar collector systems known to me in the prior art, the present invention is directed to a solar powered reactor system utilizing both active and passive means for the collection of solar energy and conversion of the same into a utilizeable heat energy source, which system is of economical construction employing relatively few components and moving parts, and which may be effectively and efficiently utilized in both industrial and household applications to provide a very high temperature energy source. Basically, the solar powered reactor of the present invention comprises a vessel for containing a heat transfer fluid, such as water, in which are located one or more heat conducting elements. The elements, in the form of metal bars or rods, are located in the heat transfer fluid to receive both direct and reflected rays of sunlight which passes through a single large, fixed position concentrating lens which is thermally insulated from the reactor vessel. A sunlight reflecting mirror system is located for movement about the large concentrating lens to follow the sun's path and concentrate and reflect sunlight through the lens into the reactor vessel.

BRIEF OBJECTS OF THE INVENTION

It is an object of the present invention to provide an improved solar powered reactor for converting solar energy into a utilizeable heat energy which may be employed in both industrial and household applications.

It is another object to provide a solar powered reactor of high efficiency, economical construction, and economical operation.

It is a further object to provide an improved solar powered reactor of simplified construction, economical manintenance, and readily adaptable for various end use applications.

BRIEF DESCRIPTION OF THE DRAWINGS

The above as well as other objects of the present invention will become more apparent, and the inventin will be better understood from the following detailed description of preferred embodiments thereof, when taken together with the accompanying drawings, in which.

DETAILED DESCRIPTION OF PREFERRED EMBODIMENTS

Figure 1:
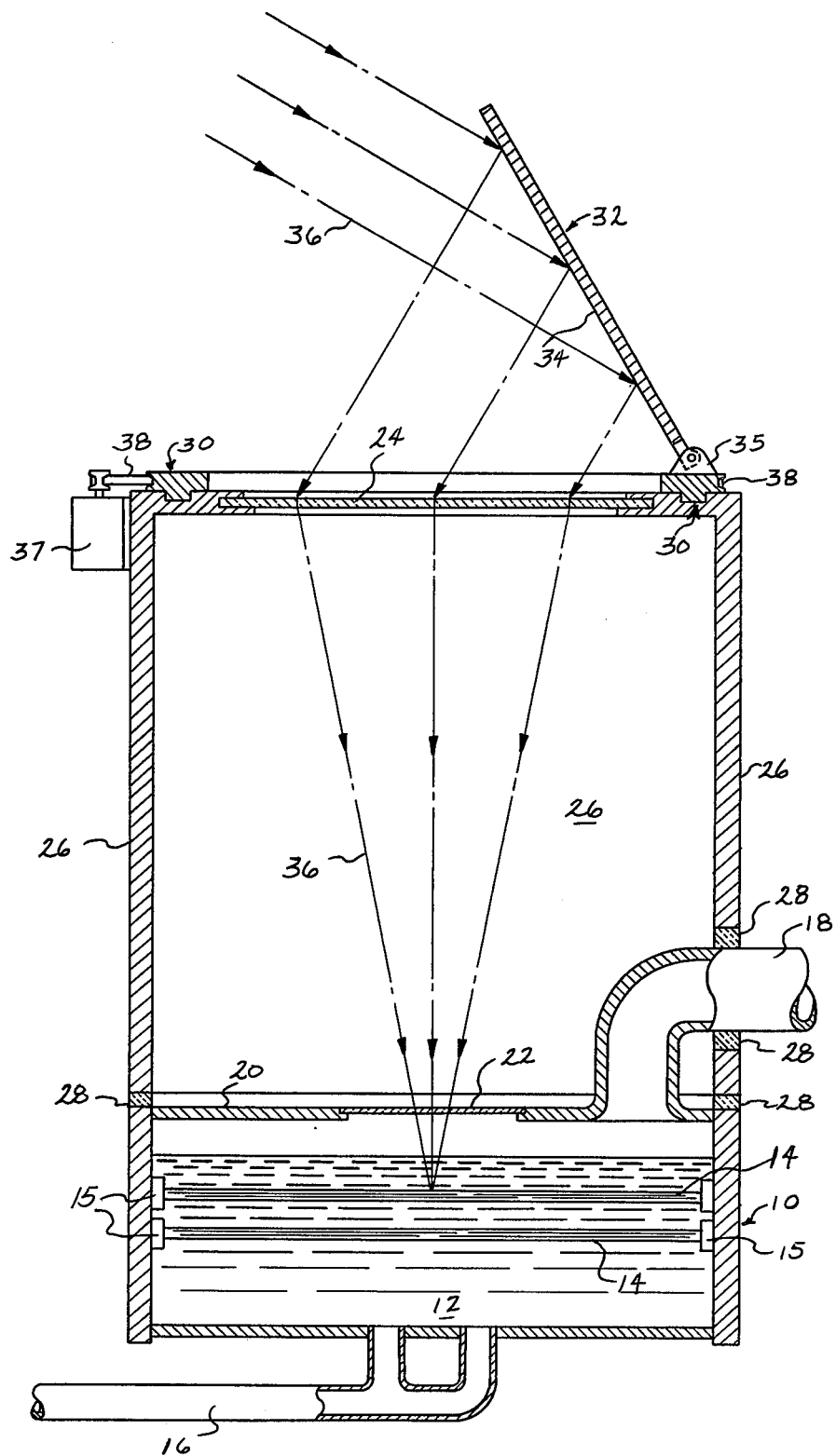
FIG. 1 is a schematic sectional side elevation view of the solar powered reactor of the present invention.

As shown in the drawings, and as described in my aforesaid U.S. patent applications, the solar powered reactor of the present invention comprises a reactor vessel 10 for containing a suitable heat transfer fluid, such as water 12. Located in the vessel are one or more heat conducting metal elements, such as stainless steel or copper rods 14, which extend through the heat transfer fluid in intimate association therewith. As seen, the bars 14 extend across the reactor vessel compartment and are suitably supported in insulators 15 on opposite side walls of the vessel. Communicating with the lower portion of the vessel compartment is a heat transfer fluid supply pipe 16, and the upper portion of the vessel compartment is provided with a heated fluid outlet pipe 18 for distribution of the heated fluid, as in the form of steam, to a source of use or storage (not shown). Typically the heated fluid may be used to power a turbine or turbogenerator to produce electricity, as a heat source for industrial or home heating, or for various other end uses.

Figure 2:
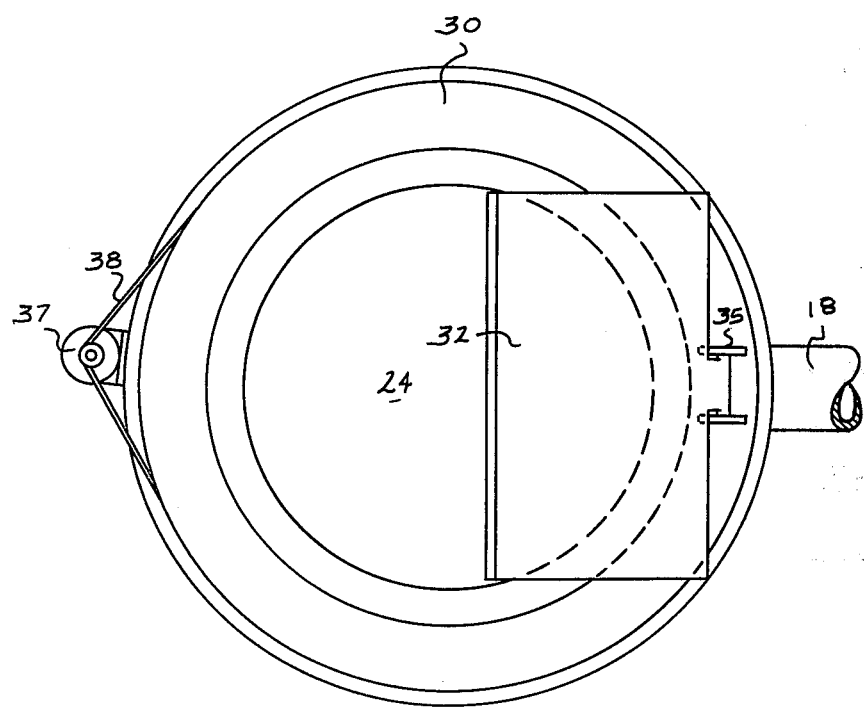
FIG. 2 is a plan view of the reactor of FIG. 1.

As seen in FIGS. 1 and 2, the walls of the vessel 10 form a reactor compartment for containing the heat transfer medium. The upper horizontal wall 20 of the vessel is provided with a window portion for transmitting light into the reactor compartment, such as a transparent glass plate 22. The sunlight is concentrated and directed through the glass plate onto the heat conductor bars 14 by passage through a single large concentrating lens, in particular, a Fresnel type lens 24. The Fresnel lens 24 is generally horizontally disposed in spaced relation directly above the reactor vessel and is supported by suitable means, such as walls 26, and is insulated against heat conduction from the reactor vessel 10 and heated fluid discharge pipe 18 by suitable heat insulating material 28 of low heat conductance.

Mounted on a circular trackway and movable ring assembly 30 for movement about the perimeter of the large Fresnel lens 24 is a solar reflector 32 having a mirrored surface 34 which may be flat or curved and which is adjustably positionable about a hinge connection 35 and horizontal axis to reflect sunlight onto the Fresnel lens for concentration and passage through glass plate 22 and onto the metal conductor bars 14, as illustrated by the light ray lines 36 in FIG. 1.

The ring assembly and solor reflector are operatively connected to a power source, such as a synchronous electric motor 37, through an interconnecting belt 38, to move the solar mirrored surface 34 about the trackway 30 to follow the sun's path of movement across the sky during portions of the daylight hours. Conventional timing means (not shown) known to those skilled in the art may be employed to operate the motor and move the reflector in tracking relationship with the movement of the sun, in a manner which would be obvious to those familar with such timing means. Typically, the reflector 32 may be moved at a rate of 15° of arc per hour to track the path of the sun, directing reflected sunlight onto the Fresnel lens 24 and into the reactor vessel, particularly during periods when the sun is at relatively low positions in the sky when little direct sunlight is received by the lens.

Reflector devices are known in the art from, for example U.S. Pat. No. 3,982,526 and a June 1971 publication "Passive Solar Array Orientation Devices", Fairbanks and Morse, pages 67-79.

The solar reflector 32 also may be supportably mounted on trackway assembly 30 for manual vertical adjustment, if desired, for optimum positioning of the same for sunlight reflection onto the Fresnel lens. The solar reflector is connected by hinge 38 to the supporting trackway assembly so that the reflector may be adjustably positioned about the aforesaid horizontal axis, and to permit it to be pivoted downwardly to a horizontal position over the Fresnel lens to serve as an insulating cover for the solar powered reactor during periods in which sunlight is not available for collection, as during night time periods. The solar reflector 32 thus serves a dual function of insulating the reactor against heat loss from the reactor system.

An important feature of the present solar powered reactor is in the provision of a single large stationary Fresnel type lens for collecting and concentrating sunlight energy at high temperatures of up to 1000° F. on the heat conducting bars 14 in the reactor vessel compartment. As known in the art, Fresnel lens are comprised of a nest of grooves, generally in circular array, cut into a single sheet of transparent material, such as plastic, with the sides of the grooves formed in such a way that light of the sun's rays are refracted at slightly different angles to concentrate and sharply focus the same at a single small area of high temperature, as on conductor bars 14 of the reactor vessel 10. Because of the large size of the single Fresnel lens, which may be economically and typically manufactured and employed in the present invention in sizes up to as much as 50 feet diameter, or larger, a large amount of both direct and reflected sunlight may be concentrated by the lens onto the heat transfer conductor bars and heat transfer medium in the vessel compartment. Preferably, the single Fresnel lens of the reactor of the present invention may be in a size range of around 12 feet or more in diameter.

Due to separation and effective thermal insulation of lens 24 from the reactor vessel compartment and the heating medium contained therein, the heat transfer fluid in the reactor vessel compartment may be heated to extremely high temperatures without fear of thermal damage to the concentrating lens.

Another important feature of the present invention resides in the use of heat conducting metal bars which are located entirely inside the heat reactor vessel in direct contact with the heat transfer fluid medium, whereby more efficient direct heating of the transfer fluid can be ontained without loss of heat energy from the collector vessel. The reactor vessel 10 containing the heat transfer fluid 12 is provided with suitable heat insulating material in the walls thereof to prevent heat loss from the reactor vessel.

In use, the solar powered reactor of the present invention may be positioned in a suitable geographic location to receive both direct and reflected sunlight through the Fresnel lens for concentration on the heat conducting bars in the reactor vessel. At sunrise, the solar reflector 32 is positioned to face the rising sun and reflect the rays therefrom onto the lens, while moving around the trackway 30 to follow the sun in its path of travel across the sky during the day to its sunset position. During midday hours, due to the large size of the single concentrating lens 24, it receives both reflected and direct sunlight rays. With proper initial tilt of the mirrored surface of the reflector 32, as by occasional manual adjustment, only a single motion of the reflector in a horizontal plane about the concentrating lens need be utilized. The tilt of the mirror may be manually adjusted at periodic intervals, such as weekly or biweekly, to accommodate the positional changes in declination of the sun in its path across the sky. If desired, the reflector 32 may be tilted or folded out of the way when the sun is approximately at its zenith for direct receipt of the sunlight onto the concentrating lens. The drive motor 37 for movement of the reflector about the lens may typically by a synchronous motor set to a proper speed to rotate the reflector through the 15° arc every hour, thereby keeping the mirror in tracking relationship with the travel of the sun. At the end of the day, the mirror is automatically returned by manual or motorized means to its morning starting position.

That which is claimed is:

1. A solar powered reactor for collecting both direct and reflected sunlight and converting solar energy contained therein into heat energy of a heat transfer fluid, comprising a reactor vessel defining a compartment for containing a heat transfer fluid, an inlet in said vessel for introducing a heat transfer fluid into said compartment, and an outlet in said vessel for discharging heated fluid from said compartment, said vessel containing an upper light transmitting wall portion for passage of sunlight into said compartment, at least one heat conducting metal element located in said compartment adjacent said light transmitting wall portion and in communication with a heat transfer fluid in said compartment for receiving sunlight thereon, a large concentrating lens positioned in spaced relation above said vessel and light transmitting wall portion for receiving and concentrating sunlight through said light transmitting wall portion and onto said at least one metal element in said compartment, solar reflector means supportably mounted adjacent said lens for movement thereabout and including a light reflecting surface pivotally adjustable to reflect sunlight onto said concentrating lens for concentrated direction thereby into said reactor vessel.

2. A solar powered reactor as defined in claim 1 wherein said lens is a single lens member of Fresnel type construction.

3. A solar powered reactor as defined in claim 2 wherein said light-transmitting wall portion of said vessel is generally horizontally disposed in an upper portion of the vessel, and said lens is generally horizontally disposed in spaced relation directly above said light-transmitting wall portion to receive both direct and reflected sunlight and direct and concentrate the same through said wall portion.

4. A solar powered reactor as defined in claim 3 wherein said solar reflector means includes a trackway supportably positioned in surrounding relation about the periphery of said lens, means mounting said light reflecting surface on said trackway for movement therearound and about said lens, means for moving said light reflecting surface about said trackway, and means mounting said light reflecting surface for pivotal movement about a generally horizontal axis to tilt the same toward and away from said lens for angular adjustment of the reflecting surface and to permit movement of the reflecting surface portion of the solar reflector means into overlying relation to said lens to serve as a heat insulator for the reactor.

5. A solar powered reactor as defined in claim 2 wherein the size of said single Fresnel type lens is at least about 12 feet in transverse dimension.

* * * * *

UNITED STATES PATENT AND TRADEMARK OFFICE
CERTIFICATE OF CORRECTION

PATENT NO. : 4,434,787
DATED : March 6, 1984
INVENTOR(S) : Ronald R. Young, II

It is certified that error appears in the above-identified patent and that said Letters Patent are hereby corrected as shown below:

In Column 2, lines 1 and 2, "concentrations" should read--concentrators--.

In Column 2, line 42, "manintenance" should read--maintenance--.

In Column 2, line 47, "inventin" should read--invention--.

Signed and Sealed this

Sixth Day of November 1984

[SEAL]

Attest:

GERALD J. MOSSINGHOFF

*Attesting Officer*  *Commissioner of Patents and Trademarks*